US007336764B2

(12) United States Patent
Reynolds

(10) Patent No.: US 7,336,764 B2
(45) Date of Patent: Feb. 26, 2008

(54) ELECTRON BEAM ACCELERATOR AND CERAMIC STAGE WITH ELECTRICALLY-CONDUCTIVE LAYER OR COATING THEREFOR

(75) Inventor: David C. Reynolds, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 124 days.

(21) Appl. No.: 11/254,390

(22) Filed: Oct. 20, 2005

(65) Prior Publication Data

US 2007/0092062 A1 Apr. 26, 2007

(51) Int. Cl.
*G01N 23/083* (2006.01)
*H05G 2/00* (2006.01)
*H05H 9/00* (2006.01)

(52) U.S. Cl. ......................... 378/58; 378/119; 315/505

(58) Field of Classification Search ................. 378/58, 378/64, 65, 119; 315/500-507
See application file for complete search history.

(56) References Cited

U.S. PATENT DOCUMENTS

| | | | | | |
|---|---|---|---|---|---|
| 4,712,074 | A | * | 12/1987 | Harvey | 313/62 |
| 4,852,131 | A | * | 7/1989 | Armistead | 378/4 |
| 4,926,452 | A | * | 5/1990 | Baker et al. | 378/22 |
| 5,317,234 | A | * | 5/1994 | Chojnacki | 315/5.41 |
| 5,325,284 | A | * | 6/1994 | Stephenson | 363/59 |
| 5,811,944 | A | * | 9/1998 | Sampayan et al. | 315/505 |
| 6,111,932 | A | * | 8/2000 | Dinsmore | 378/136 |
| 6,348,757 | B1 | * | 2/2002 | Marini | 313/359.1 |
| 6,463,123 | B1 | * | 10/2002 | Korenev | 378/69 |
| 6,489,036 | B1 | * | 12/2002 | Sherman | 428/469 |
| 6,492,784 | B1 | * | 12/2002 | Serrano | 315/506 |
| 2006/0261759 | A1 | * | 11/2006 | Chen et al. | 315/507 |

* cited by examiner

*Primary Examiner*—Allen C. Ho

(57) ABSTRACT

A ceramic electron beam accelerator is disclosed finding particularly efficacious uses in X-ray electronic circuit imaging and testing applications. The ceramic stage design eliminates the need for placing metal reinforcements between adjoining stages of the accelerator, thereby increasing the accelerator's mechanical robustness and reliability, while also reducing manufacturing costs.

38 Claims, 7 Drawing Sheets

ELECTRON BEAM ACCELERATOR AND CERAMIC STAGE WITH ELECTRICALLY-CONDUCTIVE LAYER OR COATING THEREFOR

FIELD OF THE INVENTION

This invention relates to the field of electron beam accelerators, and more particularly to devices, systems and methods for testing solder joints in printed circuit boards by means of X-ray imaging.

BACKGROUND

Automated X-ray Inspection (AXI) is an important technique utilized by electronics manufacturers to "see" through obstructions on crowded printed circuit boards to detect manufacturing defects such as hidden solder-related problems. One machine employed in AXI is Agilent's 5DX automated X-ray test system, which is capable of detecting more than 97 percent of all solder related defects (such as opens, shorts, voids, and insufficient or excess solder) and over 90 percent of all manufacturing defects on printed circuit board assemblies (PCBAs). Automated X-ray Inspection is typically employed in combination with other test solutions such as automated optical inspection (AOI) and in-circuit test (ICT).

X-ray testing is probably the best technology for efficiently and accurately inspecting ball grid array (BGA), ceramic column grid array (CCGA), chip scale package (CSP) and other area array solder joints. The Agilent 5DX AXI machine can zero-in on specific layers of a PCBA to inspect surface features with a high degree of accuracy, and is capable of seeing through obstructions such as BGA packages, RF shields and component packages to inspect hidden solder joints on both sides of a PCBA. The Agilent 5DX AXI machine also inspects traditional SMT and through-hole components such as QFPs, SSOPs, connectors, and chip components.

In addition to capturing X-ray images, the Agilent 5DX AXI machine transforms captured images into useful "actionable" information by means of a suite of algorithms that isolate open solder joints, solder bridges, misaligned and missing components, insufficient and excess solder, and solder voids. Defect data, including component, pin number, defect type, and X-ray image, are reported to an Agilent Repair Tool (ART) for repair.

The Agilent 5DX AXI machine includes a suite of tools that simplify most day-to-day development tasks in X-ray test. CAD files are translated automatically. Program thresholds are tuned by the system to increase call accuracy. A program advisor checks tests and provides recommendations to improve accuracy and fault coverage. Defect coverage reports inform the user about coverage being obtained and indicate where coverage may be improved.

As illustrated in FIG. 1, one version of a prior art Agilent 5DX automated X-ray inspection machine 100 comprises main cabinet 120, X-ray tube tower 130, rear electronics cabinet 140, monitor/keyboard cart 150, computer monitor 160 and computer keyboard 170. Keyboard 170, monitor 160 and a computer workstation (not shown in the FIGS.) serve as the user interface to X-ray inspection machine 100. X-ray tube tower 130 contains and provides access to X-ray tube 200 (not shown in FIG. 1, but shown in FIG. 2).

FIG. 2 shows a schematic cross-section of prior art X-ray tube 200 from Agilent 5DX automated X-ray inspection machine 100. As illustrated in FIG. 2, X-ray tube 200 comprises electron gun assembly 210, electron beam accelerator 220 having upper portion 230 and lower portion 240. Electron gun assembly 210 is attached to upper portion 230. X-ray beam drift assembly 225 is connected to lower portion 240 of electron beam accelerator 220. X-Ray target 235 is located beneath and attached to X-ray beam drift assembly 225. Electromagnets (not shown in the drawing) are disposed around X-ray beam drift assembly 225 and deflect electrons projected through assembly 225 onto appropriate portions of target 235.

As shown in greater detail in FIG. 3, electron beam accelerator 220 comprises a plurality of stages 250, 260, 270 and 280 that are stacked one atop the other and interconnected by means of KOVAR collars 252, 254, 256 and 258 interposed between adjoining stages. Each of stages 250, 260, 270 and 280 is designed and formed to permit a 30 keV to 60 keV voltage gradient to be developed thereacross. Each of stages 250, 260, 270 and 280 comprises, respectively, glass body 292, 294, 296 or 298. Each of glass bodies 292, 294, 296 and 298 has, respectively, central aperture 293, 295, 297 or 299 disposed therethrough, each such central aperture defining inner surface 301, 309, 305 or 307.

Continuing to refer to FIG. 3, stainless steel electron beam guides 312, 314, 316 and 318 are positioned within central apertures 293, 295, 297 and 299. Outer surfaces 302, 304, 306 and 308 of stainless steel electron beam guides 312, 314, 316 and 318 are connected to inner portions 251, 253, 255 and 257, respectively, of KOVAR collars 252, 254, 256 and 258.

As will be seen by referring to FIGS. 2 and 3, KOVAR collars 252, 254, 256 and 258 and stainless steel beam guides 312, 314, 316 and 318 have rather elaborate and complicated forms and shapes, which those skilled in the art will understand increase considerably the cost of manufacturing and assembling electron beam accelerator 220. The shapes, forms and compositions of such collars and beam guides are necessary owing to the extreme thermal and mechanical stresses to which electron beam accelerator 200 are subjected during use. Such shapes, forms and compositions arise from the disparity in physical properties between glass bodies 292, 294, 296 and 298, on the one hand, and metal collars 252, 254, 256 and 258 and beam guides 312, 314, 316 and 318, on the other hand, as well as the requirements for mechanical strength in the column formed by stacked bodies 292, 294, 296 and 298 of electron beam accelerator 220.

It will now be seen that forming the complicated shapes and forms of, and employing the expensive materials used to manufacture, glass bodies 292, 294, 296 and 298, metal collars 252, 254, 256 and 258 and stainless steel beam guides 312, 314, 316 and 318 increase manufacturing costs of accelerator 220. What is needed is a simpler means of attaching adjoining stages to one another, in combination with lower-cost materials and structures for forming beam guides.

SUMMARY OF THE INVENTION

In accordance with one aspect of the present invention, a ceramic body is provided that facilitates the construction and operation of an electron beam accelerator in an X-ray tube while reducing the cost of manufacturing and increasing the physical robustness of same. Various embodiments of the present invention find particularly efficacious use in military, space and harsh environment applications.

In one embodiment of the present invention, a stage for use in an electron beam accelerator is provided, the stage comprising a ceramic-containing body, the body having an inner portion and an outer portion, a central aperture being disposed through the inner portion and defining an inner surface, the outer portion having an outer surface, the inner surface having an electrically-conductive layer or coating disposed thereon, the outer surface having an electrically-resistive layer or coating disposed thereon.

In another embodiment of the present invention, a plurality of the above-described stages are incorporated into an electron beam accelerator. In still another embodiment of the present invention, the foregoing plurality of stages are incorporated into an X-ray tube.

The present invention further includes within its scope various methods making and using the foregoing stages, electron beam accelerators and X-ray tubes, including for the purpose of imaging solder joints in printed circuit boards.

The various embodiments of the ceramic-containing body, stage, electron beam accelerator and tube of the present invention reduce manufacturing and materials costs, and therefore reduce costs associated with prior art means and methods of imaging solder joints in printed circuit boards, such as with the Agilent 5DX AXI.

Indeed, upon having read and appreciated the import of the specification, drawings and claims hereof, one skilled in the art will understand that various embodiments of the present invention find application outside the field of X-ray imaging and may be employed generally to: (a) lay down conductive and resistive coatings on ceramic-containing insulators; (b) control voltage gradients with a high degree of precision; (c) act as corona guards; (d) permit accurate and highly-controlled electron beam formation and focusing; (e) permit attachment of adjoining stages by means of brazing or soldering; (f) control electrical break-down; (g) control, reduce or eliminate electrostatic charge build-up; (h) increase the mechanical robustness of stage and tube assemblies; (i) increase safety; (l) reduce costs; and (k) increase or maximize device life.

BRIEF DESCRIPTIONS OF THE DRAWINGS

The foregoing and other aspects of the invention will become apparent after having read the detailed description of a preferred embodiment of the invention set forth below and after having referred to the following drawings, in which like reference numerals refer to like parts:

Figure 1:
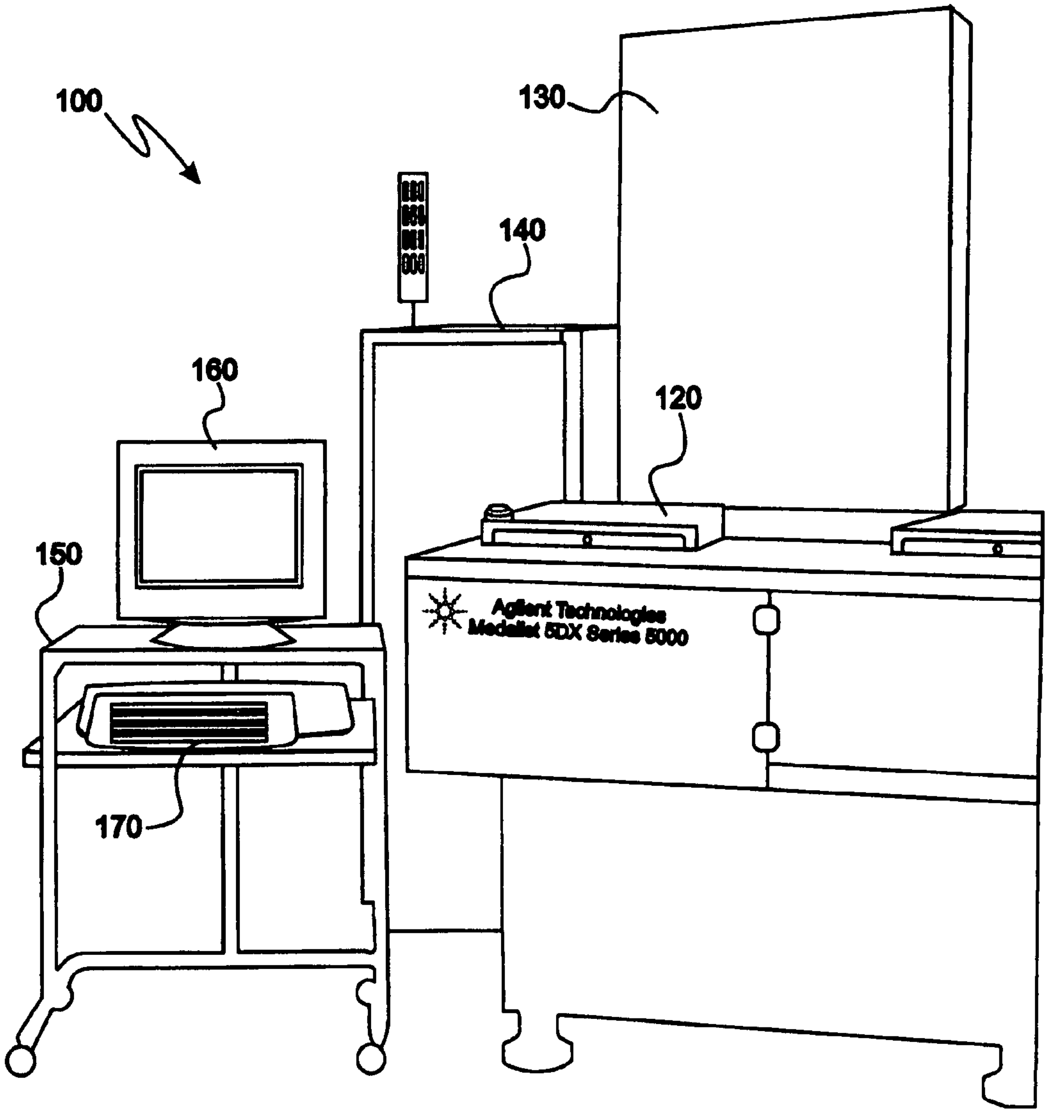
Prior Art FIG. 1
FIG. 1 shows a prior art Agilent 5DX automated X-ray inspection machine.
Figure 2:
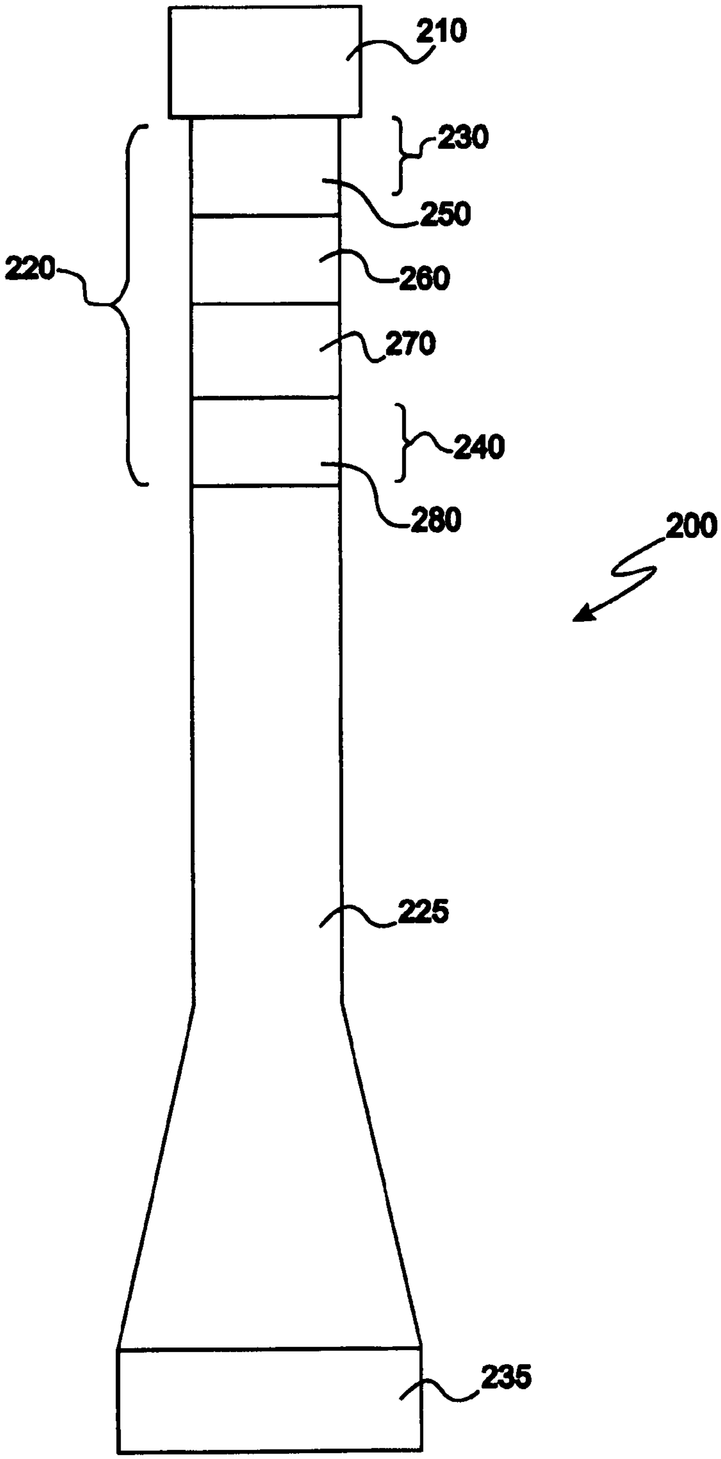
Prior Art FIG. 2
FIG. 2 shows a schematic representation of a prior art X-ray tube from an Agilent 5DX automated X-ray inspection machine.
Figure 3:
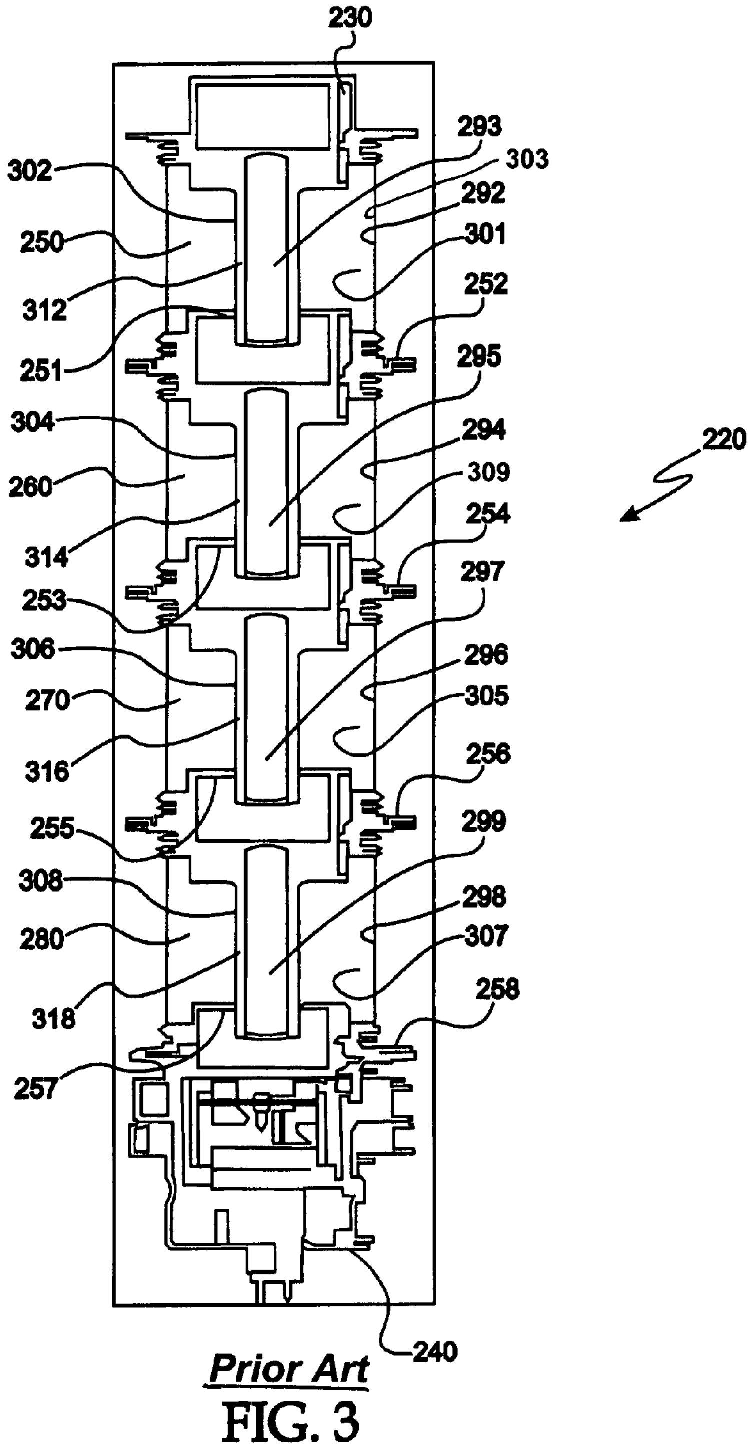
Prior Art FIG. 3
FIG. 3 shows a schematic cross-section of a prior art electron beam accelerator from the X-ray tube of an Agilent 5DX automated X-ray inspection machine.
Figure 4A:
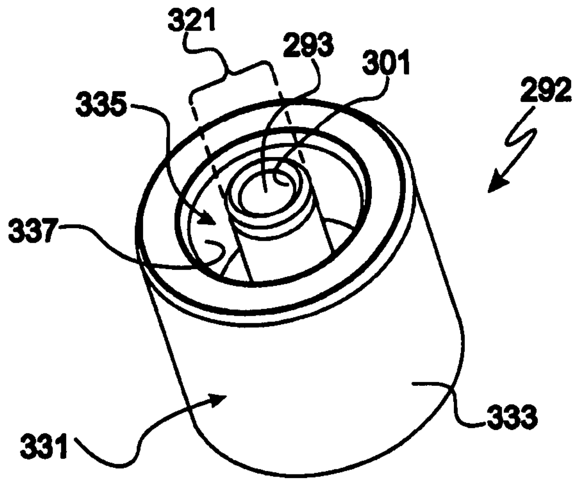
Figure 4B:
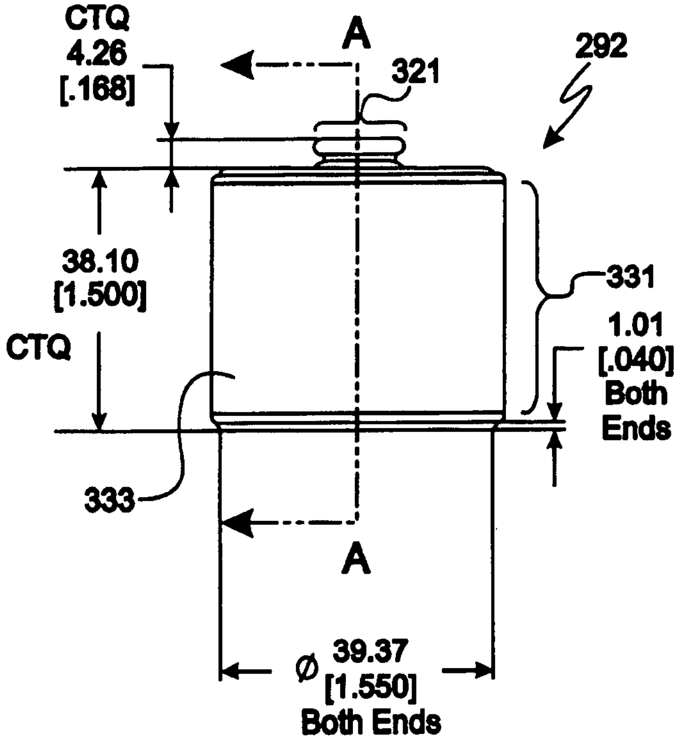
Figure 4C:
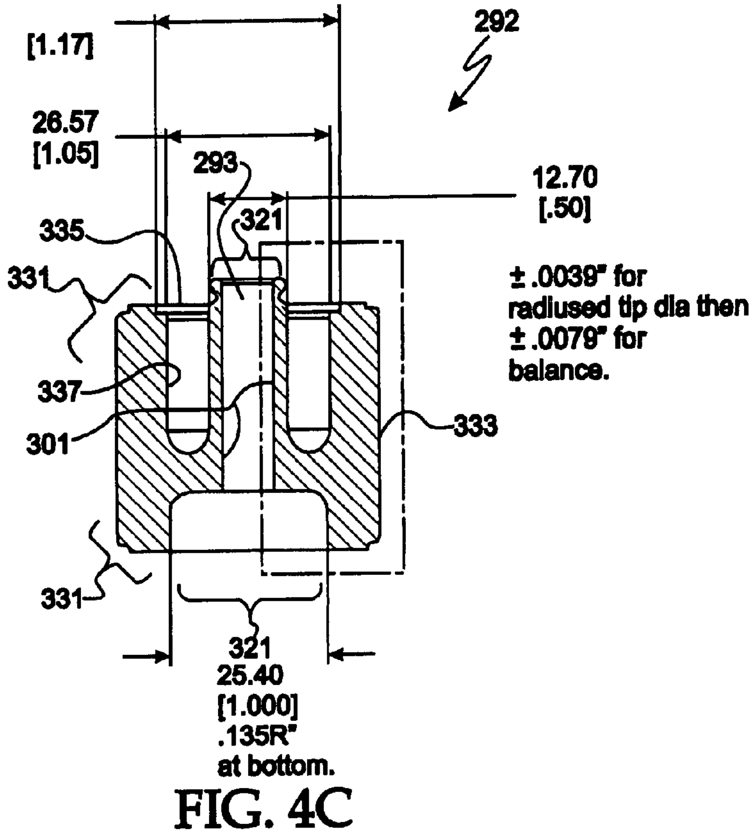
Figure 4D:
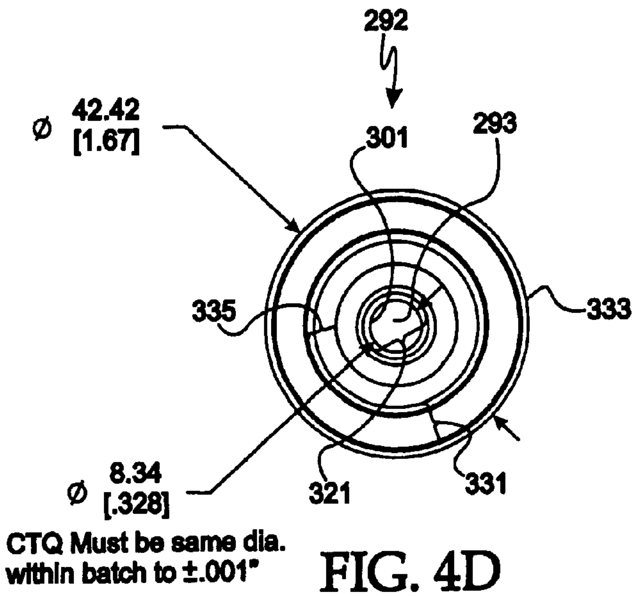
Figure 5:
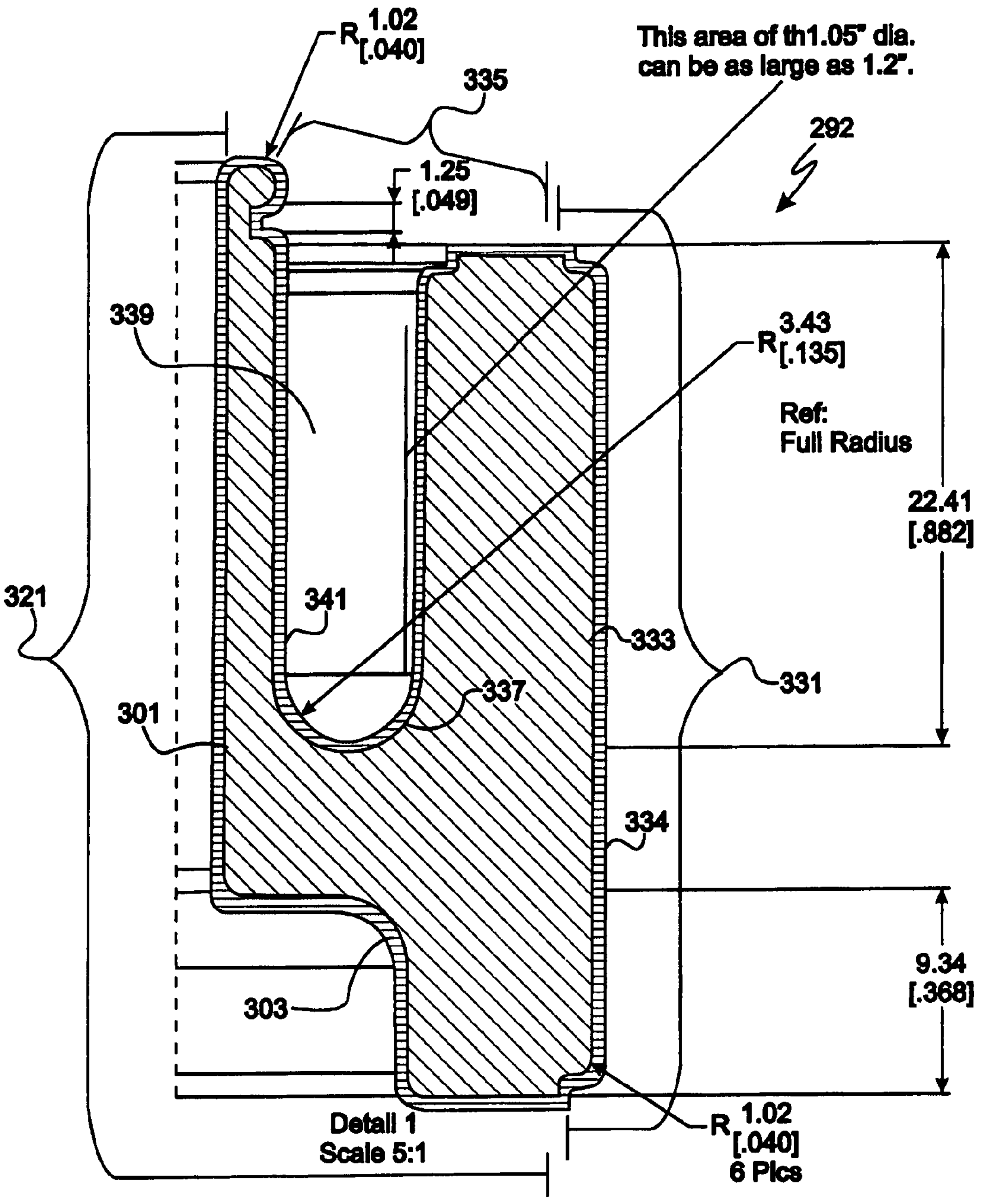

FIGS. 4*a* through 4*d* show different views of one embodiment of a single stage of the present invention;

FIG. 5 shows a partial schematic cross-sectional view of the embodiment of the present invention shown in FIGS. 4*a* through 4*d;*

Figure 6:
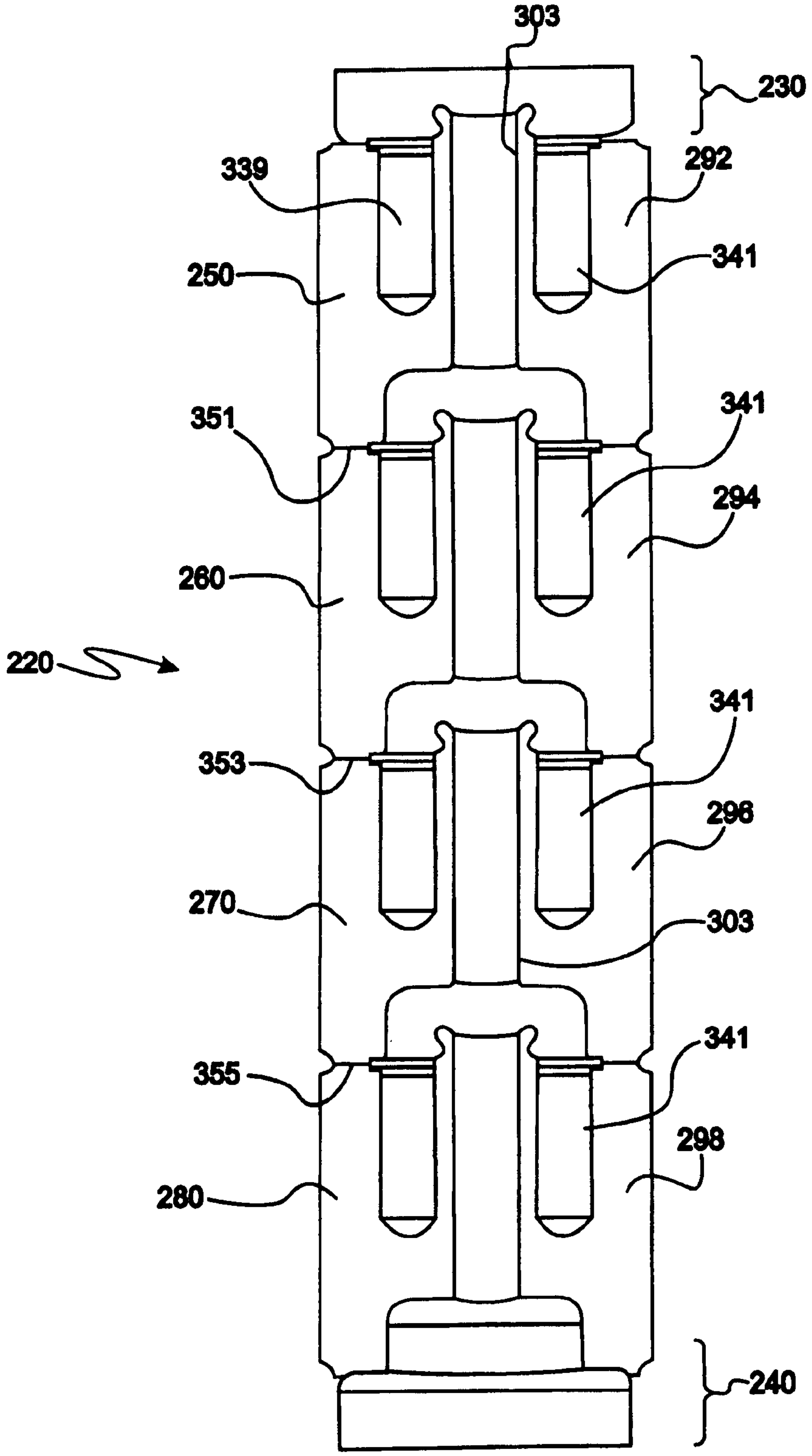

FIG. 6 shows a schematic cross-sectional view of one embodiment of the electron beam accelerator of the present invention.

DETAILED DESCRIPTIONS OF THE PREFERRED EMBODIMENTS

As employed in the specification and claims hereof, the term "ceramic" means a material or composition of matter comprising one of the many forms of aluminum oxide, and especially $Al_2O_3$. The term "layer or coating" includes layers or coatings that are mechanically, chemically, electrically or electrochemically attached to an inner surface of a ceramic body. The term "sleeve includes within its scope a sleeve or lining that is mechanically, chemically or electrochemically attached to an inner surface of a ceramic body.

FIG. 4*a* shows a top perspective view of one embodiment of ceramic body 292 of the present invention. FIG. 4*b* shows a side view of ceramic body 292 illustrated in FIG. 4*a*. FIG. 4*c* shows a cross-sectional view of ceramic body 292 illustrated in FIG. 4*a*. FIG. 4*d* shows a top view of ceramic body 292 illustrated in FIG. 4*a*. FIG. 5 shows a partial cross-sectional view of ceramic body 292 illustrated in FIG. 4*a*.

Referring now to FIG. 4*a*, there is shown a top perspective view of one embodiment of ceramic body 292 of stage 250 of the present invention. Ceramic body 292 has central aperture 293 disposed therethrough, central aperture 293 defining inner surface 301. Ceramic body 292 comprises inner portion 321 and outer portion 331. Central aperture 293 is disposed through inner portion 321. Outer portion 331 comprises outer surface 333. Inner surface 301 has electrically-conductive layer or coating 303 disposed thereon (see FIG. 5). Outer surface 333 has electrically-resistive layer or coating 334 disposed thereon (see FIG. 5).

In one embodiment of the present invention, and as shown in FIGS. 4*a*, 4*c*, 4*d*, 5 and 6, ceramic body 292 further comprises intermediate portion 335 having intermediate surface 337 disposed between inner surface 301 and outer surface 333. Intermediate surface 337 is preferably electrically insulative and substantially electrically non-conductive. As shown in FIGS. 4*a*, 4*c*, 4*d*, 5 and 6, intermediate portion 335 preferably comprises a recess disposed between inner portion 321 and outer portion 331. Intermediate portion 335 provides a means of standing-off voltage for electron acceleration.

As shown in FIG. 5, intermediate portion 335 comprises recess 339 and electrically resistive or insulative layer 341. Electrically conductive layer 303 is disposed on inner surface 301, electrically resistive layer 334 is disposed on outer surface 333 and electrically insulative or non-conductive layer 341 is disposed on intermediate surface 337.

In preferred embodiments of the present invention, ceramic bodies 292, 294, 296 and 298 are formed of any suitable ceramic-containing material including, but not limited to, at least one of alumina, aluminosilicate, aluminum nitride, beryllium oxide, boron carbide, borosilicate glass, glass, graphite, hafnium carbide, lead glass, machinable glass ceramic, magnesium, magnesium powder, partially stabilized zirconia, mullite, nitride-bonded silicon carbide, quartz glass, reaction-bonded silicon carbide ceramic, silicon bonded nitrite, sapphire, silicon aluminum oxynitride, silicon, silicon nitride, silicon carbide, sintered silicon carbide, titanium carbide, tungsten carbide, vanadium carbide, tungsten carbide, yttrium oxide, zirconia, zirconium, zirconium carbide, zirconium-toughened alumina, and combinations, mixtures and/or alloys of all the foregoing.

In preferred embodiments of the present invention, electrically-conductive layer or coating 303 is formed any suitable electrically-conductive material including, but not limited to, at least one of aluminum, antimony, barium, beryllium, bismuth, cadmium, calcium, cesium, chromium, cobalt, copper, erbium, germanium, gold, hafnium, indium, iridium, iron, lanthanum, lead, manganese, magnesium, molybdenum, nickel, niobium, osmium, palladium, platinum, plutonium, praseodymium, rhenium, rhodium, samarium, selenium, silicon, silver, tantalum, technetium, thulium, titanium, tungsten, uranium, vanadium, plastic, and combinations, mixtures and/or alloys of all the foregoing.

Also in preferred embodiments of the present invention, electrically-resistive or electrically non-conductive layers or coatings 334 and 341 are formed any suitable electrically-resistive or non-conductive material including, but not limited to, comprise at least one of aluminum, antimony, barium, beryllium, bismuth, cadmium, calcium, cesium, chromium, cobalt, copper, erbium, germanium, gold, hafnium, indium, iridium, iron, lanthanum, lead, manganese, magnesium, molybdenum, nickel, niobium, osmium, palladium, platinum, plutonium, praseodymium, rhenium, rhodium, samarium, selenium, silicon, silver, lanthanum, tantalum, technetium, thulium, titanium, tungsten, uranium, vanadium, plastic, resistive mixtures for resistors, and combinations, mixtures and/or alloys of all the foregoing.

At least portions of electrically-conductive layer or coating 303 may be formed by at least one of brazing, cathodic arc deposition, chemical vapor deposition, cladding, electric arc spraying, electroless plating, electron-beam vapor deposition, electrolytic deposition, electroplating, ion plating, ion implantation, laser surface alloying, laser cladding, physical vapor deposition, plasma deposition, plasma spraying, sputtering, sputter deposition, thermal spray coating, vacuum coating deposition, vapor deposition, and combinations and/or mixtures of all the foregoing.

At least portions of electrically-resistive layers or coatings 334 and 341 may be formed by at least one of brazing, cathodic arc deposition, chemical vapor deposition, cladding, electric arc spraying, electroless plating, electron-beam vapor deposition, electrolytic deposition, electroplating, ion plating, ion implantation, laser surface alloying, laser cladding, physical vapor deposition, plasma deposition, plasma spraying, sputtering, sputter deposition, thermal spray coating, vacuum coating deposition, vapor deposition, and combinations and/or mixtures of all the foregoing.

Each of ceramic bodies 292, 294, 296 and 298 and stages 250, 260, 270 and 280 is preferably configured to withstand a voltage gradient thereacross selected from the group consisting of ranging between about 1 keV and about 200 keV, ranging between about 2 keV and about 150 keV, ranging between about 4 keV and about 100 keV, ranging between about 10 keV and about 50 keV, and ranging between about 15 keV and about 45 keV, or about 10 keV, about 20 keV, about 30 keV, about 40 keV, about 50 keV, about 60 keV, about 70 keV, about 80 keV, about 90 keV or about 100 keV. Such stages may further be particularly configured for use in an X-ray tube for imaging solder joints in a printed circuit board.

As shown in FIG. 6, stages 250, 260, 270 and 280 are stacked one atop the other and are connected to one another at their respective upper and lower ends by at least one of brazed connection and/or soldered connection 351, 353 and 355. Such brazed and/or soldered connections preferably comprise, but are not limited to, at least one of aluminum, aluminum-silicon, chromium, cobalt, at least one cobalt binder, copper, at least one filler metal, gold, indium, iridium, magnesium, molybdenum, nickel, niobium, niobium carbide, a nonferrous metal, phosphorus, platinum, tantalum, tantalum carbide, titanium, titanium carbide, tungsten, tungsten carbide, zinc and combinations, mixtures and alloys of all the foregoing.

The various different embodiments of electron beam accelerator 220 of the present invention are preferably incorporated into an X-ray tube further comprising electron gun assembly 210, electron beam drift assembly 225 and target 235. It is to be noted, however, that the ceramic stages of the present invention are not limited to X-ray applications.

The present invention includes within its scope various methods of making electron beam accelerators comprising one or more stages 250, 260, 270 and/or 280. Such methods may comprise forming ceramic-containing body 292, 294, 296 and/or 298 and forming electrically-conductive layer or coating 303 on the inner surfaces 301,309, 305 and 307 of each body. Such methods further preferably comprise forming electrically-resistive layer or coating 334 and/or 341 on outer surfaces 333 or intermediate surface 337 of such bodies; using at least one of the materials described hereinabove to form a ceramic-containing body; forming electrically-conductive layer or coating 303 using at least one of the materials described hereinabove; forming electrically-resistive layer or coating 341 or 334 using further comprises using at least one of the materials described hereinabove; attaching the lower end of a first stage to an upper end of the second stage using one of the least one of the methods described hereinabove; energizing an electron gun assembly; projecting electrons from the electron gun assembly into the electron beam accelerator; accelerating the electrons through the electron beam accelerator into the electron beam drift assembly, and causing the electrons to hit the target; and employing electrons emitted from the tube to image or irradiate an object, such as, for example, imaging solder joints in a printed circuit board.

As will now become apparent, while specific embodiments of ceramic electron beam accelerators 220 are described and disclosed herein, many variations and alternative embodiments of the present invention may be constructed or implemented without departing from the spirit and scope of the present invention.

For example, the physical dimensions and configurations shown in FIGS. 4*a* through 5 are merely illustrative and are representative of but one possible embodiment of the present invention. In addition to being circular in cross-section, the stage of the present invention may be oval, elliptical, square, rectangular or other shape. As a further example, the present invention includes within its scope electron beam accelerators having ceramic stages employed in scanning electron microscopes (SEMs), lasers, non-circuit imaging and testing X-ray accelerators, free electron lasers (FELs), scanning transmission electron microscopes (STEMS) and low- and high-energy linear accelerators. The present invention further includes within its scope electrically-conductive sleeves disposed within central aperture 293 that functionally replace coating or layer 303. Such sleeves may be attached to inner surface 301 by any number of suitable means, such as brazing, soldering, gluing and the like.

Indeed, upon having read and appreciated the import of the specification, drawings and claims hereof, one skilled in the art will understand that various embodiments of the present invention find application outside the field of X-ray imaging and may be employed generally to: (a) lay down conductive and resistive coatings on ceramic-containing insulators; (b) control voltage gradients with a high degree of precision; (c) act as corona guards; (d) permit accurate and highly-controlled electron beam formation and focusing; (e) permit attachment of adjoining stages by means of brazing or soldering; (f) control electrical break-down; (g) control, reduce or eliminate electrostatic charge build-up; (h) increase the mechanical robustness of stage and tube assemblies; (i) increase safety; (j) reduce costs; and (k) increase or maximize device life.

It is to be understood, therefore, that the scope of the present invention is not to be limited to the specific embodiments disclosed herein, but is to be determined by looking to the appended claims and their equivalents. Consequently, changes and modifications may be made to the particular embodiments of the present invention disclosed herein without departing from the spirit and scope of the present invention as defined in the appended claims.

I claim:

1. A stage for use in an electron beam accelerator, the stage comprising a ceramic-containing body, the body having an inner portion, an intermediate portion, and an outer portion, a central aperture being disposed through the inner portion and defining an inner surface, the outer portion having an outer surface, the inner surface having an electrically-conductive layer or coating disposed thereon, the outer surface having an electrically-resistive layer or coating disposed thereon, the intermediate portion having a recess formed between the inner portion and the outer portion, and the intermediate portion having an intermediate surface disposed between the inner surface and the outer surface.

2. The stage of claim 1, wherein at least one of the intermediate surface and the intermediate portion is electrically insulative.

3. The stage of claim 1, wherein at least one of the intermediate surface and the intermediate portion is substantially electrically nonconductive.

4. The stage of claim 1, wherein the outer surface is substantially circular in cross-section.

5. The stage of claim 1, wherein the inner surface is substantially circular in cross-section.

6. The stage of claim 1, wherein the ceramic-containing body comprises at least one of alumina, aluminosilicate, aluminum nitride, beryllium oxide, boron carbide, borosilicate glass, glass, graphite, hafnium carbide, lead glass, machinable glass ceramic, magnesium, magnesium powder, partially stabilized zirconia, mullite, nitride-bonded silicon carbide, quartz glass, reaction-bonded silicon carbide ceramic, silicon bonded nitrite, sapphire, silicon aluminum oxynitride, silicon, silicon nitride, silicon carbide, sintered silicon carbide, titanium carbide, tungsten carbide, vanadium carbide, tungsten carbide, yttrium oxide, zirconia, zirconium zirconium carbide, zirconium-toughened alumina and combinations, mixtures and alloys of all the foregoing.

7. The stage of claim 1, wherein the electrically-conductive layer or coating comprises at least one of aluminum, antimony, barium, beryllium, bismuth, cadmium, calcium, cesium, chromium, cobalt, copper, erbium, germanium, gold, hafnium, indium, iridium, iron, lanthanum, lead, manganese, magnesium, molybdenum, nickel, niobium, osmium, palladium, platinum, plutonium, praseodymium, rhenium, rhodium, samarium, selenium, silicon, silver, tantalum, technetium, thulium, titanium, tungsten, uranium, vanadium, plastic and combinations, mixtures and alloys of all the foregoing.

8. The stage of claim 1, wherein the electrically-resistive layer or coating comprises at least one of aluminum, antimony, barium, beryllium, bismuth, cadmium, calcium, cesium, chromium, cobalt, copper, erbium, germanium, gold, hafnium, indium, iridium, iron, lanthanum, lead, manganese, magnesium, molybdenum, nickel, niobium, osmium, palladium, platinum, plutonium, praseodymium, rhenium, rhodium, samarium, selenium, silicon, silver, lanthanum, tantalum, technetium, thulium, titanium, tungsten, uranium, vanadium, plastic, resistive mixtures for resistors and combinations, mixtures and alloys of all the foregoing.

9. The stage of claim 1, wherein at least portions of the electrically-conductive layer or coating are formed by at least one of brazing, cathodic arc deposition, chemical vapor deposition, cladding, electric arc spraying, electroless plating, electron-beam vapor deposition, electrolytic deposition, electroplating, ion plating, ion implantation, laser surface alloying, laser cladding, physical vapor deposition, plasma deposition, plasma spraying, sputtering, sputter deposition, thermal spray coating, vacuum coating deposition, vapor deposition, and combinations or mixtures of all the foregoing.

10. The stage of claim 1, wherein at least portions of the electrically-resistive layer or coating are formed by at least one of brazing, cathodic arc deposition, chemical vapor deposition, cladding, electric arc spraying, electroless plating, electron-beam vapor deposition, electrolytic deposition, electroplating, ion plating, ion implantation, laser surface alloying, laser cladding, physical vapor deposition, plasma deposition, plasma spraying, sputtering, sputter deposition, thermal spray coating, vacuum coating deposition, vapor deposition, and combinations or mixtures of all the foregoing.

11. The stage of claim 1, wherein the stage is configured to withstand a voltage gradient thereacross selected from the group consisting of about 10 keV, about 20 keV, about 30 keV, about 40 keV, about 50 keV, about 60 keV, about 70 keV, about 80 keV, about 90 keV and about 100 keV.

12. The stage of claim 1, wherein the stage is configured for use in an X-ray tube for imaging solder joints in a printed circuit board.

13. At least first and second stages for use in an electron beam accelerator, the first and second stages comprising first and second ceramic-containing bodies, respectively, the first and second bodies having first and second inner portions, intermediate portions, and outer portions, respectively, first and second central apertures being disposed through the first and second inner portions and defining first and second inner surfaces, respectively, the first and second outer portions having first and second outer surfaces, respectively, the first and second inner surfaces having first and second electrically-conductive layers or coatings disposed thereon, respectively, the first and second outer surfaces having first and second electrically-resistive layers or coatings disposed thereon, respectively, the first intermediate portion having a first recess formed between the first inner portion and the first outer portion, the second intermediate portion having a second recess formed between the second inner portion and the second outer portion, the first intermediate portion having a first intermediate surface disposed between the first inner surface and the first outer surface, the second intermediate portion having a second intermediate surface disposed between the second inner surface and the second outer surface, the body of the first stage having a lower end and the body of the second stage having an upper end, the lower end of the first stage being attached to the upper end of the second stage by at least one of a brazed connection and a soldered connection.

14. The at least first and second stages of claim 13, wherein the brazed or soldered connection comprises at least one of aluminum, aluminum-silicon, chromium, cobalt, at least one cobalt binder, copper, at least one filler metal, gold, indium, iridium, magnesium, molybdenum, nickel, niobium, niobium carbide, a nonferrous metal, phosphorus, platinum, silver, tantalum, tantalum carbide, titanium, titanium carbide, tungsten, tungsten carbide, zinc and combinations, mixtures and alloys of all the foregoing.

15. The at least first and second stages of claim 13, wherein at least one of the first and second ceramic-containing bodies comprises at least one of alumina, alumino-silicate, aluminum nitride, beryllium oxide, boron carbide, borosilicate glass, glass, graphite, hafnium carbide, lead glass, machinable glass ceramic, magnesium, magnesium powder, partially stabilized zirconia, mullite, nitride-bonded silicon carbide, quartz glass, reaction-bonded silicon carbide ceramic, silicon bonded nitrite, sapphire, silicon aluminum oxynitride, silicon, silicon nitride, silicon carbide, sintered silicon carbide, titanium carbide, tungsten carbide, vanadium carbide, tungsten carbide, yttrium oxide, zirconia, zirconium, zirconium carbide zirconium-toughened alumina and combinations, mixtures and alloys of all the foregoing.

16. The at least first and second stages of claim 13, wherein at least one of the first and second electrically-conductive layers or coatings comprises at least one of aluminum, antimony, barium, beryllium, bismuth, cadmium, calcium, cesium, chromium, cobalt, copper, erbium, germanium, gold, hafnium, indium, iridium, iron, lanthanum, lead, manganese, magnesium, molybdenum, nickel, niobium, osmium, palladium, platinum, plutonium, praseodymium, rhenium, rhodium, samarium, selenium, silicon, silver, tantalum, technetium, thulium, titanium, tungsten, uranium, vanadium, plastic and combinations, mixtures and alloys of all the foregoing.

17. The at least first and second stages of claim 13, wherein at least one of the first and second electrically-resistive layers or coatings comprises at least one of aluminum, antimony, barium, beryllium, bismuth, cadmium, calcium, cesium, chromium, cobalt, copper, erbium, germanium, gold, hafnium, indium, iridium, iron, lanthanum, lead, manganese, magnesium, molybdenum, nickel, niobium, osmium, palladium, platinum, plutonium, praseodymium, rhenium, rhodium, samarium, selenium, silicon, silver, lanthanum, tantalum, technetium, thulium, titanium, tungsten, uranium, vanadium, plastic, resistive mixtures for resistors and combinations, mixtures and alloys of all the foregoing.

18. The at least first and second stages of claim 13, wherein at least portions of at least one of the first and second electrically-conductive layers or coatings are formed by at least one of brazing, cathodic arc deposition, chemical vapor deposition, cladding, electric arc spraying, electroless plating, electron-beam vapor deposition, electrolytic deposition, electroplating, ion plating, ion implantation, laser surface alloying, laser cladding, physical vapor deposition, plasma deposition, plasma spraying, sputtering, sputter deposition, thermal spray coating, vacuum coating deposition, vapor deposition, and combinations or mixtures of all the foregoing.

19. The at least first and second stages of claim 13, wherein at least portions of at least one of the first and second electrically-resistive layers or coatings are formed by at least one of brazing, cathodic arc deposition, chemical vapor deposition, cladding, electric arc spraying, electroless plating, electron-beam vapor deposition, electrolytic deposition, electroplating, ion plating, ion implantation, laser surface alloying, laser cladding, physical vapor deposition, plasma deposition, plasma spraying, sputtering, sputter deposition, thermal spray coating, vacuum coating deposition, vapor deposition, and combinations or mixtures of all the foregoing.

20. The at least first and second stages of claim 13, wherein the first and second stages are configured for use in an X-ray tube for imaging solder joints in a printed circuit board.

21. An X-ray tube, comprising:

(a) an electron gun assembly;

(b) an electron beam accelerator having an upper portion and a lower portion, the electron gun assembly being attached to the upper portion, the electron beam accelerator comprising at least one stage, the at least one stage comprising a ceramic-containing body, the body having an inner portion, an intermediate portion, and an outer portion, a central aperture being disposed through the inner portion and defining an inner surface, the outer portion having an outer surface, the inner surface having an electrically-conductive layer or coating disposed thereon, the outer surface having an electrically-resistive layer or coating disposed thereon, the intermediate portion having a recess formed between the inner portion and the outer Portion, and the intermediate portion having an intermediate surface disposed between the inner surface and the outer surface;

(c) an electron beam drift assembly comprising an upper end and a lower end, the upper end being attached to the lower portion of the electron beam accelerator, and (d) a target attached to the lower end of the electron beam drift assembly.

22. The X-ray tube of claim 21, wherein the electron beam accelerator comprises a plurality of stages, the stages being brazed or soldered to one another by at least one brazed or soldered connection.

23. The X-ray tube of claim 22, wherein each connection comprises at least one of aluminum, aluminum-silicon, chromium, cobalt, at least one cobalt binder, copper, at least one filler metal, gold, indium, iridium, magnesium, molybdenum, nickel, niobium, niobium carbide, a nonferrous metal, phosphorus, platinum, silver, tantalum, tantalum carbide, titanium, titanium carbide, tungsten, tungsten carbide, zinc and combinations, mixtures and alloys of all the foregoing.

24. The X-ray tube of claim 22, wherein the electron beam accelerator comprises between two and eight stages stacked one atop the other and connected by brazed or soldered connections.

25. The X-ray tube of claim 24, wherein each stage of the electron beam accelerator is configured to operate between about 10 keV and about 100 keV.

26. The X-ray tube of claim 24, wherein each stage of the electron beam accelerator is configured to operate between about 20 keV and about 75 keV.

27. The X-ray tube of claim 24, wherein each stage of the electron beam accelerator is configured to operate between about 30 keV and about 50 keV.

28. A method of making a stage for use in an electron beam accelerator, the stage comprising a ceramic-containing body, the body having an inner portion and an outer portion, a central aperture being disposed through the inner portion and defining an inner surface, the outer portion having an outer surface, the inner surface having an electrically-conductive layer or coating disposed thereon, the outer surface having an electrically-resistive layer or coating disposed thereon, the method comprising:

(a) forming the ceramic-containing body;

(b) forming the electrically-conductive layer or coating on the inner surface of the body; and (c) forming an intermediate portion in the stage, the intermediate portion having a recess between the inner portion and the outer portion, and the intermediate portion having an intermediate surface disposed between the inner surface and the outer surface.

29. The method of claim 28, further comprising forming the electrically-resistive layer or coating on the outer surface of the body.

30. The stage of claim 29, wherein the step of forming the electrically-resistive layer or coating further comprises using at least one of aluminum, antimony, barium, beryllium, bismuth, cadmium, calcium, cesium, chromium, cobalt, copper, erbium, germanium, gold, hafnium, indium, iridium, iron, lanthanum, lead, manganese, magnesium, molybdenum, nickel, niobium, osmium, palladium, platinum, plutonium, praseodymium, rhenium, rhodium, samarium, selenium, silicon, silver, lanthanum, tantalum, technetium, thulium, titanium, tungsten, uranium, vanadium, plastic, resistive mixtures for resistors and combinations, mixtures and alloys of all the foregoing, to form the electrically-resistive layer or coating.

31. The method of claim 28, wherein at least one of the intermediate surface and the intermediate portion is electrically insulative.

32. The method of claim 28, wherein at least one of the intermediate surface and the intermediate portion is substantially electrically nonconductive.

33. The method of claim 28, wherein the step of forming the ceramic-containing body further comprises using at least one of alumina, aluminosilicate, aluminum nitride, beryllium oxide, boron carbide, borosilicate glass, glass, graphite, hafnium carbide, lead glass, machinable glass ceramic, magnesium, magnesium powder, partially stabilized zirconia, mullite, nitride-bonded silicon carbide, quartz glass, reaction-bonded silicon carbide ceramic, silicon bonded nitrite, sapphire, silicon aluminum oxynitride, silicon, silicon nitride, silicon carbide, sintered silicon carbide, titanium carbide, tungsten carbide, vanadium carbide, tungsten carbide, yttrium oxide, zirconia, zirconium, zirconium carbide, zirconium-toughened alumina and combinations, mixtures and alloys of all the foregoing, to form the body.

34. The method of claim 28, wherein the step of forming the electrically-conductive layer or coating further comprises using at least one of aluminum, antimony, barium, beryllium, bismuth, cadmium, calcium, cesium, chromium, cobalt, copper, erbium, germanium, gold, hafnium, indium, iridium, iron, lanthanum, lead, manganese, magnesium, molybdenum, nickel, niobium, osmium, palladium, platinum, plutonium, praseodymium, rhenium, rhodium, samarium, selenium, silicon, silver, tantalum, technetium, thulium, titanium, tungsten, uranium, vanadium, plastic and combinations, mixtures and alloys of all the foregoing, to form the electrically-conductive layer or coating.

35. The method of claim 28, wherein the stage is a first stage, the ceramic-containing body is a first body, the inner portion is a first inner portion, the outer portion is a first outer portion, the central aperture is a first central aperture, the inner surface is a first inner surface, the outer surface is a first outer surface, the electrically-conductive layer or coating is a first electrically-conductive layer or coating, the electrically-resistive layer or coating is a first electrically-resistive layer or coating, the method further comprising forming a second stage, the second stage comprising a second ceramic-containing body, the second body having a second inner portion and a second outer portion, a second central aperture being disposed through the second inner portion and defining a second inner surface, the second outer portion having a second outer surface, the second inner surface having a second electrically-conductive layer or coating disposed thereon, the second outer surface having a second electrically-resistive layer or coating disposed thereon, the body of the first stage having a lower end and the body of the second stage having an upper end.

36. The method of claim 35, further comprising attaching the lower end of the first stage to the upper end of the second stage.

37. The method of claim 36, wherein the step of attaching further comprises at least one of brazing, cathodic arc deposition, chemical vapor deposition, cladding, electric arc spraying, electroless plating, electron-beam vapor deposition, electrolytic deposition, electroplating, ion plating, ion implantation, laser surface alloying, laser cladding, physical vapor deposition, plasma deposition, plasma spraying, sputtering, sputter deposition, thermal spray coating, vacuum coating deposition, vapor deposition, and combinations or mixtures of all the foregoing.

38. A method of using an X-ray tube, the X-ray tube comprising an electron gun assembly, an electron beam accelerator having an upper portion and a lower portion, the electron gun assembly being attached to the upper portion, the electron beam accelerator comprising at least one stage, the at least one stage comprising a ceramic-containing body, the body having an inner portion and an outer portion, a central aperture being disposed through the inner portion and defining an inner surface, the outer portion having an outer surface, the inner surface having an electrically-conductive layer or coating disposed thereon, the outer surface having an electrically-resistive layer or coating disposed thereon, an electron beam drift assembly comprising an upper end and a lower end, the upper end being attached to the lower portion of the electron beam accelerator, and a target attached to the lower end of the electron beam drift assembly, the method comprising:

(a) energizing the electron gun assembly;

(b) projecting electrons from the electron gun assembly into the electron beam accelerator:

(c) accelerating the electrons through the electron beam accelerator into the electron beam drift assembly;

(d) causing the electrons to hit the and target; and (e) employing X-rays emitted from the target to image solder points in a printed circuit board.

* * * * *

UNITED STATES PATENT AND TRADEMARK OFFICE

CERTIFICATE OF CORRECTION

PATENT NO. : 7,336,764 B2
APPLICATION NO. : 11/254390
DATED : February 26, 2008
INVENTOR(S) : Reynolds It is certified that error appears in the above-identified patent and that said Letters Patent is hereby corrected as shown below:

In column 7, line 44, in Claim 6, after "zirconium" insert -- , --.

In column 9, line 13, in Claim 15, after "carbide" insert -- , --.

In column 10, line 16, in Claim 21, delete "Portion," and insert -- portion, --, therefor.

In column 12, line 47, in Claim 38, after "accelerator" delete ":" and insert -- ; --, therefor.

In column 12, line 50, in Claim 38, before "target;" delete "and".

In column 12, line 52, in Claim 38, delete "points and insert -- joints --, therefor.

Signed and Sealed this

Eighth Day of July, 2008

JON W. DUDAS
*Director of the United States Patent and Trademark Office*